United States Patent [19]

Bruno et al.

[11] Patent Number: 5,567,107
[45] Date of Patent: Oct. 22, 1996

[54] EXTRAVEHICULAR APPARATUS FOR LOADING AND SECURING CARGO

[76] Inventors: Michael R. Bruno, 3950 Southwood Dr., Oconomowoc, Wis. 53066; Robert M. Boyd, W2740 Rock River Paradise, Watertown, Wis. 53094

[21] Appl. No.: 284,043

[22] Filed: Aug. 1, 1994

Related U.S. Application Data

[63] Continuation of Ser. No. 976,896, Nov. 16, 1992, abandoned.

[51] Int. Cl.$^6$ ............................. B60P 3/06; B60R 9/06
[52] U.S. Cl. ................. 414/462; 224/524; 224/536; 414/541; 414/545
[58] Field of Search ......................... 414/462, 921, 414/545, 622, 556; 187/267; 224/504, 521, 524, 536; 280/769

[56] References Cited

U.S. PATENT DOCUMENTS

| | | | |
|---|---|---|---|
| 3,174,634 | 3/1965 | Peck | 414/545 X |
| 4,738,581 | 4/1988 | Kuhlman | 414/462 |
| 4,741,660 | 5/1988 | Kent | 414/462 |
| 4,775,282 | 10/1988 | Van Vliet | 414/462 |
| 5,011,361 | 4/1991 | Peterson | 414/462 |
| 5,122,024 | 6/1992 | Stokes | 414/462 |
| 5,137,411 | 8/1992 | Eul et al. | 414/462 |

FOREIGN PATENT DOCUMENTS

| | | | |
|---|---|---|---|
| 2249828 | 5/1975 | France | 187/267 |

*Primary Examiner*—Karen Merritt
*Assistant Examiner*—Janice L. Krizek
*Attorney, Agent, or Firm*—Whyte Hirschboeck Dudek S.C.

[57] ABSTRACT

A device has a sliding tube assembly which can be mounted to a motor vehicle. The tube assembly has three tubes which coaxially telescope between a lowered loading/unloading position and either a raised storage position or a raised loaded position. A pivotable platform attached to the tube assembly is controlled by a logic mechanism which senses whether cargo is present on the platform. If cargo is present, the platform may be raised and a locking mechanism secures the cargo to the platform. If no cargo is present as the platform is raised, it pivots into a folded storage position and is held securely by the locking mechanism. When the platform is in one of the two raised positions, the tube assembly and platform tilt forward. The device is driven by a motor activated linear actuator extending down through the tube assembly. A control system governs operation of the device.

15 Claims, 11 Drawing Sheets

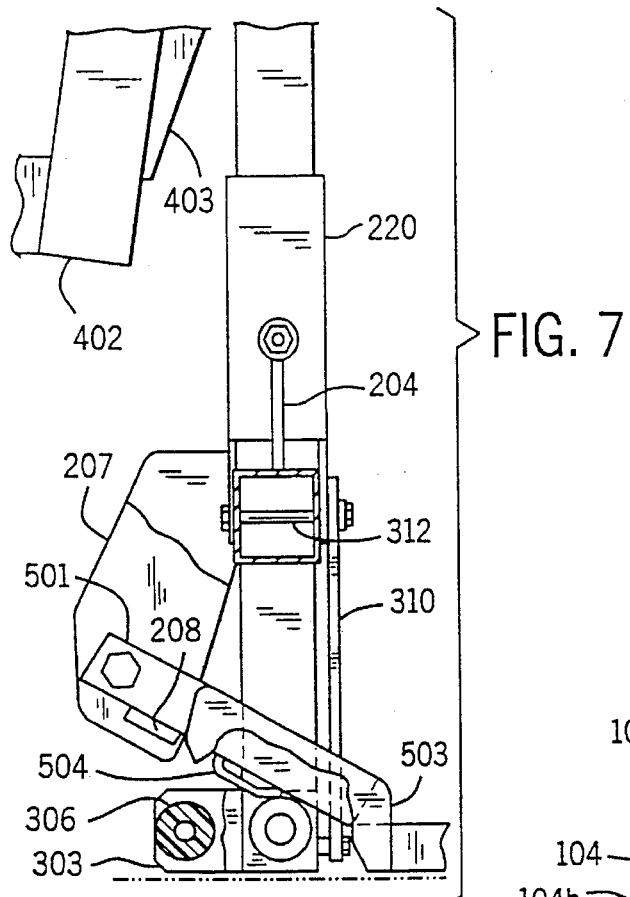
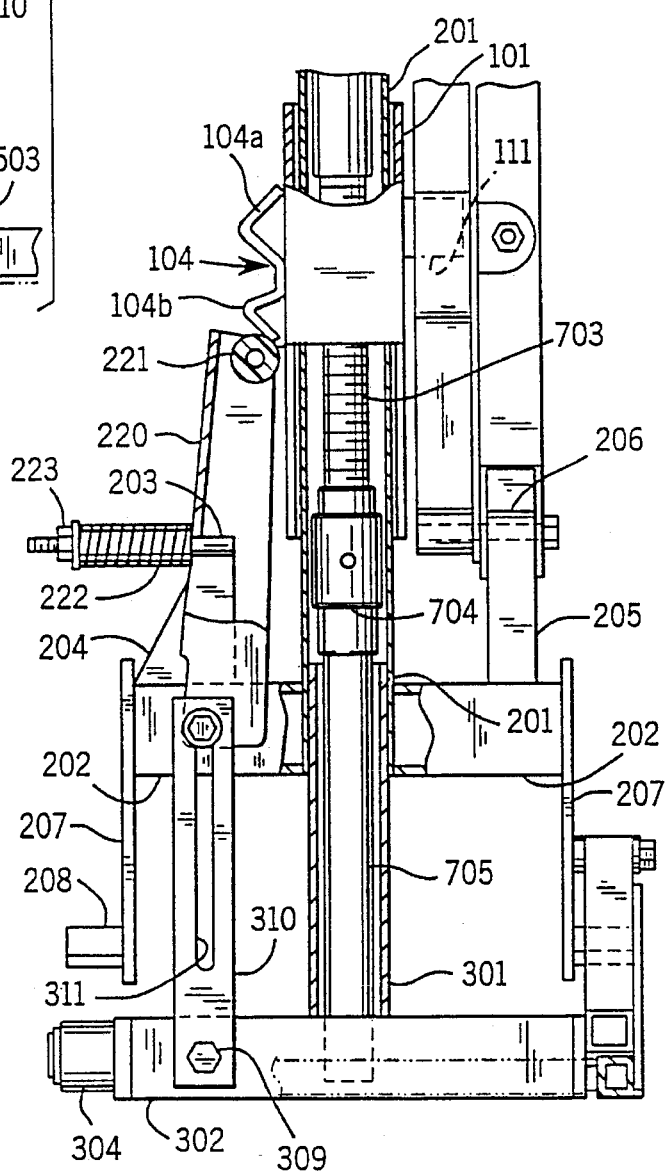

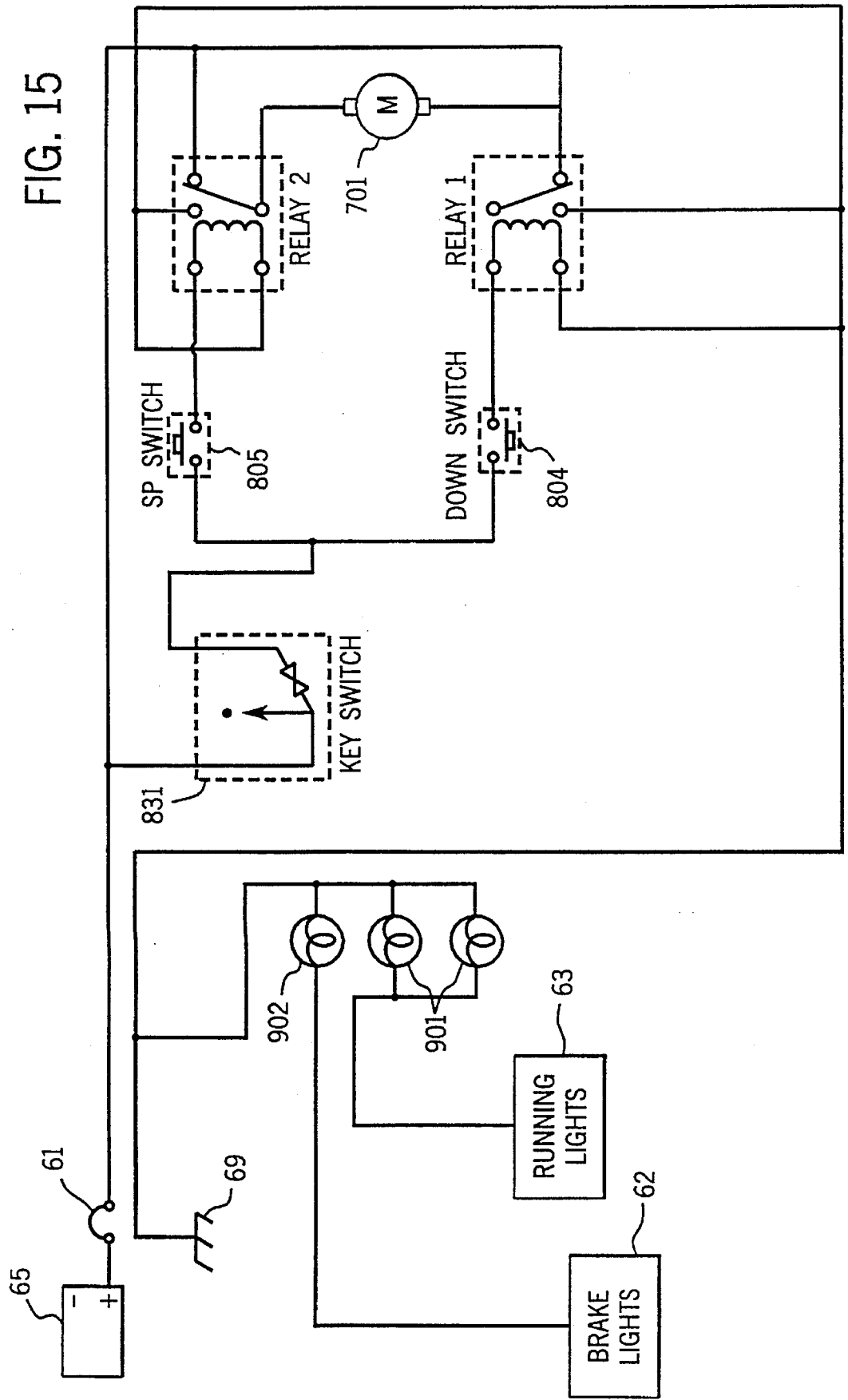

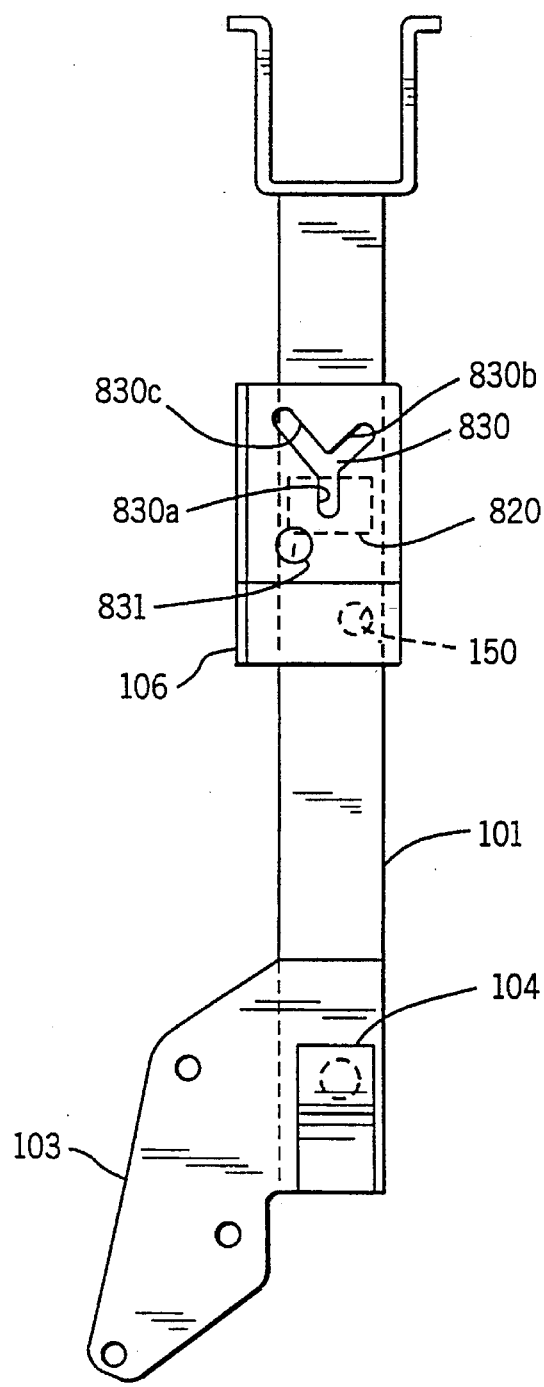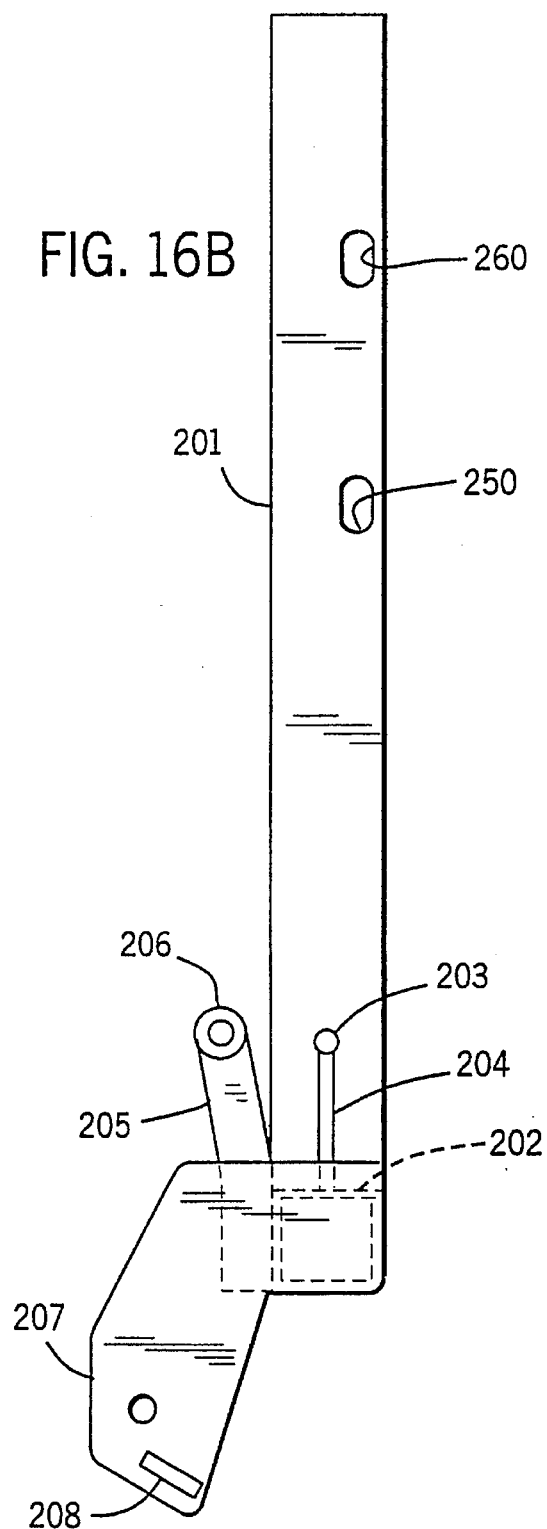

EXTRAVEHICULAR APPARATUS FOR LOADING AND SECURING CARGO

Statement as to rights to inventions made under federally-sponsored research and development, if any: None.

CROSS-REFERENCES TO RELATED APPLICATION

This is a continuation of application Ser. No. 07/976,896 filed on Nov. 16, 1992, now abandoned

BACKGROUND OF THE INVENTION

1. Field of the Invention

The present invention relates generally to devices used to load, secure and transport motorized personal transportation vehicles, commonly called "carts" or "scooters". These vehicles typically are used by physically challenged individuals and others with impaired personal mobility, such as elderly individuals. More particularly, the present invention relates to an apparatus intended to be mounted to the outside of a motor vehicle and designed to sense automatically whether a scooter is present on the lift platform of the device. If a scooter is present, the apparatus raises the vehicle and secures it on the platform. If no such vehicle is present, then the lift platform is stored in a secured position.

2. Description of Related Art

In the past, extravehicular hoists have required the operator to position the cargo on the platform, secure the cargo, raise the platform, and finally lock the platform in its raised loaded position. Similarly, lowering the loaded platform has required reversing these steps. Frequently, each of these steps had to be performed manually by the operator. If the operator failed to secure the cargo properly, the cargo could fall off the platform during storage or transportation, thereby damaging the cargo and/or the vehicle to which the hoist was mounted.

Additionally, when the hoist was not in use to carry cargo, the hoist would have to be raised and folded into an unloaded storage position, if it could be folded at all. This again resulted in the manual performance of additional steps by the operator to prepare the hoist for storage and/or transport.

The problems encountered with the above-described operation of a hoist were exacerbated by the fact that the person who had to perform these various steps often was a physically challenged individual or elderly individual who did not possess the strength and/or dexterity to perform the various steps properly. Such individuals found it virtually impossible to accomplish loading and unloading of cargo, such as scooters weighing in excess of 100 pounds, without assistance from another person.

A hoist device which permits an individual, especially one of the aforementioned physically challenged or elderly persons, to load, raise, secure and transport a scooter or other cargo by operating a single, simple control mechanism that does not require significant strength or dexterity and overcomes the shortcomings of earlier systems would represent a significant advancement in the art.

OBJECTS AND SUMMARY OF THE INVENTION

It is an object of the present invention to provide a device for loading, securing and transporting various types of cargo, including a variety of types of personal transportation vehicles typically used by physically challenged individuals and other individuals with impaired personal mobility.

It is another object of the present invention to provide a device which senses whether cargo is present on a lift platform and, if cargo is present, automatically activates a locking mechanism to secure the cargo on the platform.

It is a different object of the present invention to provide a device which senses whether cargo is present on a lift platform and, if cargo is not present, automatically pivots the platform into a storage position.

It is still another object of the present invention to provide a device which reduces the likelihood of undesirable lowering of the platform.

It is yet one other object of the present invention to provide a device which accomplishes sensing of the presence of cargo and loading of the lift assembly by mechanical means.

It is still one more object of the present invention to provide a device having a locking mechanism which secures cargo when it is present on the platform, and secures the platform in its unloaded storage position to avoid rattling and the like during transport of the device.

How these and other objects of the present invention are accomplished will be explained in a detailed description in connection with the FIGURES. Generally, however, the objects of the invention are accomplished in a device having a sliding tube assembly which can be mounted to a motor vehicle with a mounting weldment. The tube assembly has three tubes which coaxially telescope between either a raised storage position or a raised loaded position and a lowered loading/unloading position. A pivotable platform attached to the tube assembly is controlled by a logic mechanism which senses whether cargo is present on the platform. If cargo is present, the platform may be raised and a locking mechanism secures the cargo to the platform. If no cargo is present on the platform when it is raised, the platform pivots into a folded storage position and is held securely in that storage position by the locking mechanism. When the platform is in one of the two raised positions, the tube assembly and platform tilt forward. The device is driven by a motor activated linear actuator which extends down through the tube assembly. A control system governs operation of the device.

Other variations, modifications, applications, advantages and ways in which the objects are accomplished will become apparent to those presently of ordinary skill in the art after reviewing the specification and are deemed to fall within the scope of the present invention if they fall within the scope of the claims which follow the description of the preferred embodiment.

DETAILED DESCRIPTION OF THE DRAWINGS

FIG. 7 is a partial side view of the base area of the present invention in its lowered loading/unloading position.

FIG. 8 is a partial front view in partial section of the present invention in a partially raised position.

FIG. 15 is a schematic diagram of the electrical system of the present invention.

FIG. 16A is a partial side view of the outer tube of the present invention.

FIG. 16B is a partial side view of the center tube of the present invention.

In the FIGURES, like reference numerals refer to like components.

DESCRIPTION OF THE PREFERRED EMBODIMENT

The present invention is an electrically powered hoist designed for loading, securing and transporting various types of cargo. It is particularly helpful in loading, securing and transporting personal transportation devices (commonly called "carts" and "scooters") such as those used by the elderly and others who are physically challenged with respect to personal mobility.

The hoist device of the present invention is designed to be mounted to a motor vehicle such as an automobile or a van. In the preferred embodiment, the device can be mounted to the motor vehicle by means of a class III hitch. The preferred embodiment will be discussed in the context of loading and securing a scooter weighing 200 pounds or less. Changes constituting matters of design choice can be made to adapt the present invention to use with other types of cargo having different characteristics as to weight, size and the like.

General Configuration

Figure 1:
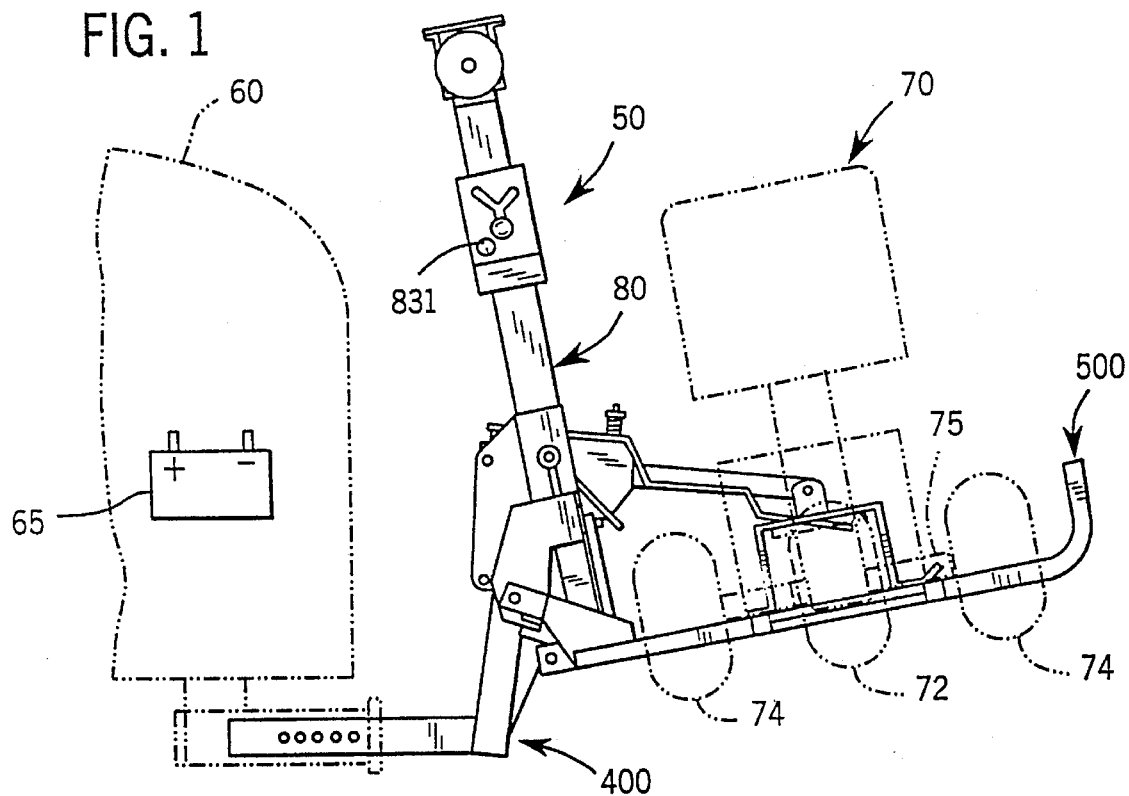
FIG. 1 is a side view of the present invention in its raised loaded position mounted to a motor vehicle with a scooter (shown in phantom) secured to the platform.
Figure 3:
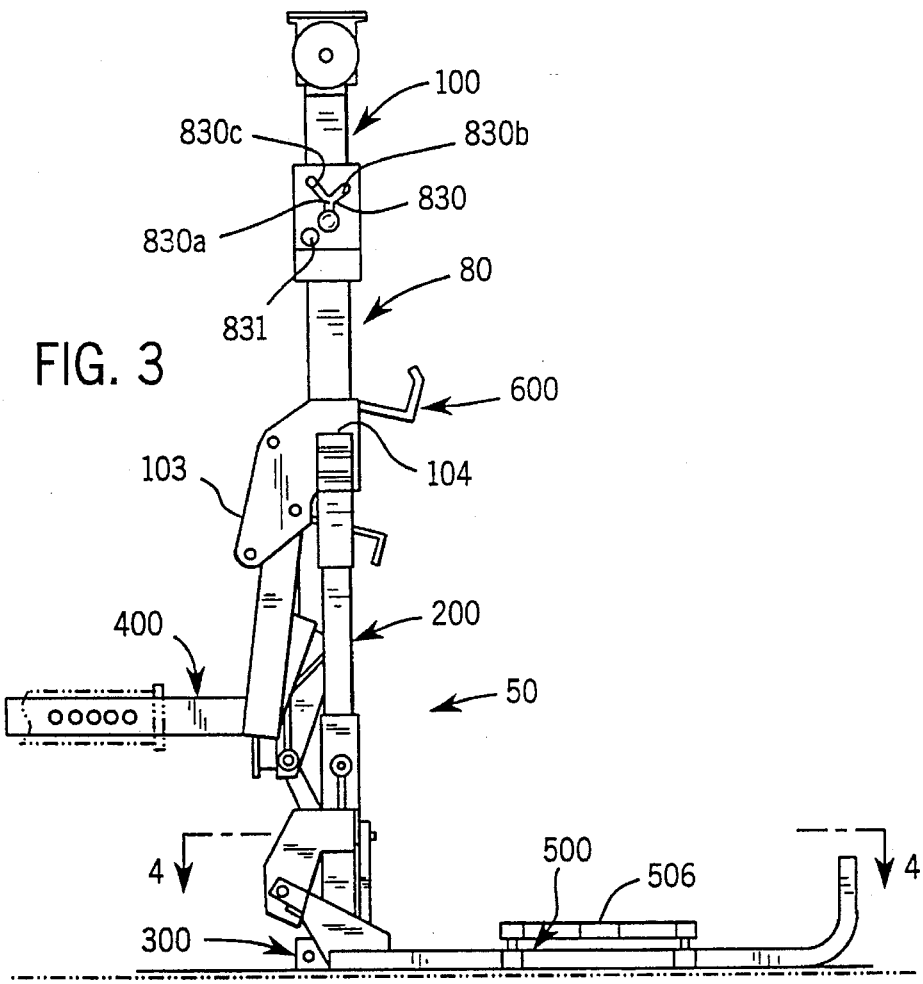
FIG. 3 is a side view of the present invention in its lowered loading/unloading position.

The preferred embodiment of the present invention is shown in the FIGURES. Generally, as seen in FIG. 1, the device 50 has a main mounting weldment 400 which holds a slide tube assembly 80. The slide tube assembly 80 is made up of an outer slide tube unit 100, a center slide tube unit 200 and an inner slide tube unit 300, as seen in FIG. 3, and is used to move a platform weldment 500, which is pivotably mounted to center tube unit 200, relative to the motor vehicle 60 to which the device is mounted. Retracting or extending a linearly moving actuator (described in more detail below) causes the inner slide tube unit 300 to move linearly up or down, respectively, relative to the outer tube unit 100. As the actuator is retracted or extended, center tube unit 200 also moves up or down, respectively. However, movement of center tube unit 200 is not necessarily linear throughout the entire stroke of the actuator and is determined by the presence or absence of a scooter or other cargo on the platform of the device.

A logic mechanism is used in the present invention to fold and unfold the platform 500 into and out of a raised, unloaded, stored position when no scooter is present on the platform. The logic mechanism also keeps the platform 500 in a horizontal position and activates and releases a locking mechanism 600 when a scooter is present on the platform 500. Operation of the logic mechanism is dependent upon the gross balance of the platform 500 and center tube unit 200 as acted upon by the inner tube unit 300 at a point slightly to the weight bearing side of the platform pivot.

The logic mechanism is designed to introduce controlled resistance to movement of the center tube unit 200 in order to upset the balance of the platform 500 and center tube unit 200 when the platform 500 is raised without a scooter present. The resistance introduced by the logic mechanism is not sufficient to upset the balance of the platform 500 and center tube unit 200 when a scooter is present on the platform 500. The logic mechanism includes an adjustable, spring loaded follower arm attached to the center tube unit 200 which contacts a specially profiled detent ramp attached to the outer tube unit 100 at certain points during raising and lowering of the platform 500.

Figure 5:
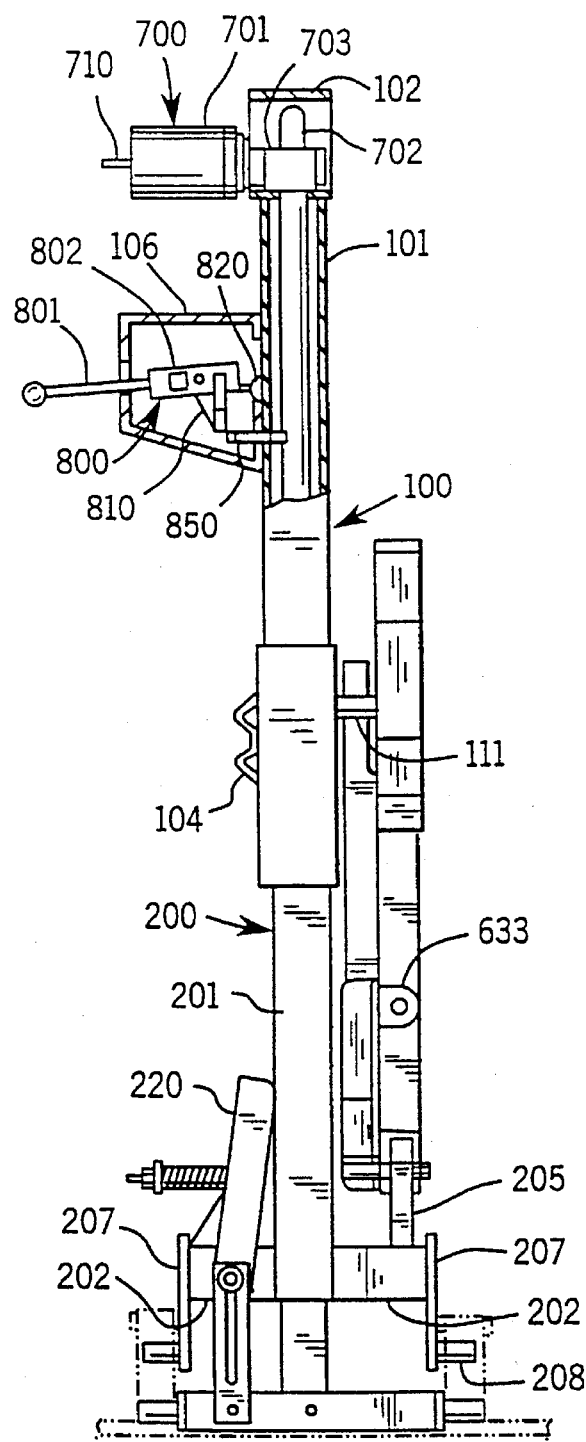
FIG. 5 is a front view of the present invention in partial section taken along the line 5—5 of FIG. 4.

The pivotable platform weldment 500 and the locking mechanism 600 work in conjunction with one another to secure a scooter 70 to the platform 500. A control system 800 and drive means 700 shown in FIG. 5 are also attached to the slide tube assembly 80. Because devices of this type are likely to obscure the motor vehicle's license plate and high-mounted third brake light, the drive means of the present invention is covered with a highly visible, illuminated license plate mount having license plate lights 901 and a high-mounted third brake light 902, as seen in FIG. 15.

Figure 16C:
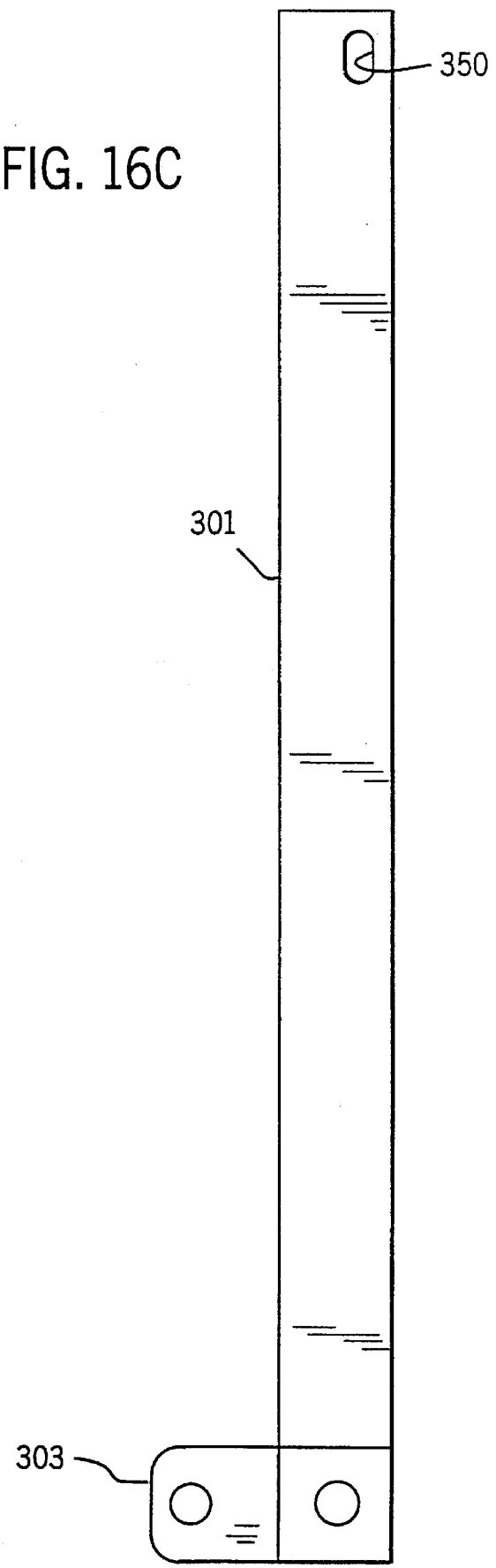
FIG. 16C is a partial side view of the inner tube of the present invention.

The outer tube unit 100 is constructed around an outer tube 101 which, in the preferred embodiment, is made of 12 gauge steel and has a square cross-sectional shape. As seen in FIG. 5, an actuator housing 102 is welded to the upper end of the outer tube 101. A control housing 106 is mounted slightly below the upper end of the outer tube 101 in the preferred embodiment. This housing 106 contains operational controls and a latching mechanism that govern the movement of the platform weldment 500 via the slide tube assembly 80. Tube 101 has a latch pin slot 150 which is enclosed by the control housing 106, as seen in FIG. 16A.

A pair of pivot plates 103 are welded to the outer tube 101 adjacent its bottom end. The plates 103 are mounted parallel to one another and two rollers 110 are mounted between and perpendicular to the plates 103. These rollers 110; shown in FIGS. 9 and 11, preferably are made of an ultra-high molecular weight material such as polyethylene. A detent ramp 104, shown in FIGS. 5 and 8, has an upper node 104a and a lower node 104b, and is welded to one of the plates 103. The purpose of this ramp 104 will be explained below. A roller 111 is rotatably mounted to the other plate 103. The axis of the roller 111 is perpendicular to plates 103.

Figure 12:
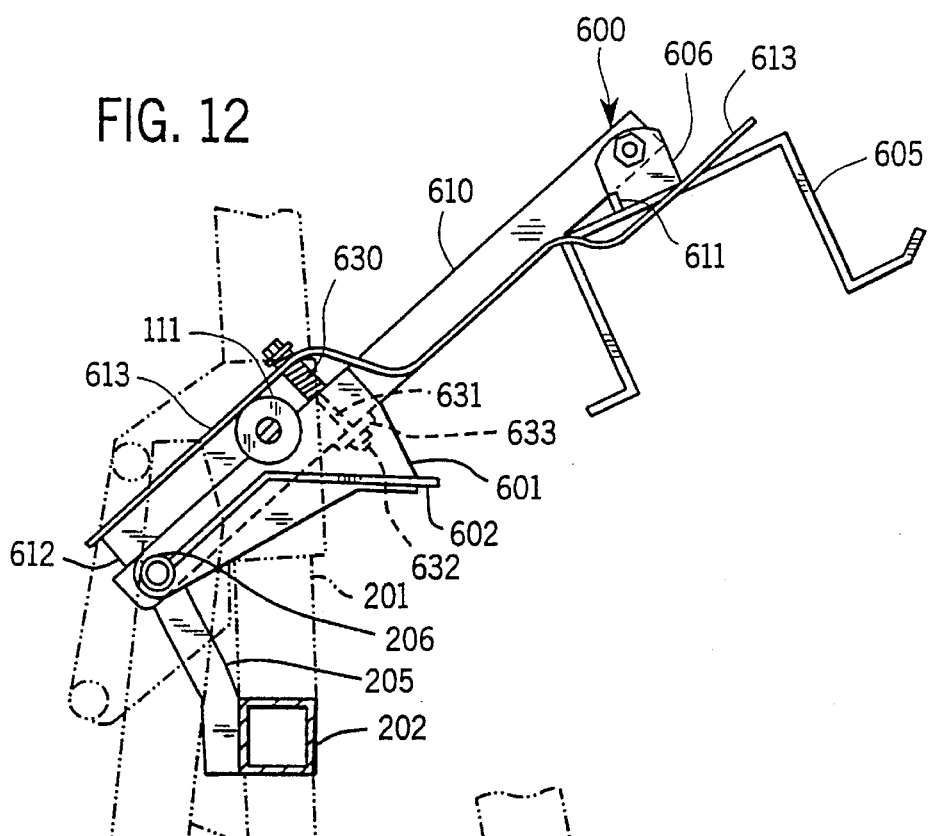
FIG. 12 is a side view of the locking mechanism of the present invention with its locking arm in a partially lowered position.

The center tube unit 200 shown in FIG. 5 is also constructed around a slide tube 201 which, like the outer tube 101, is made of 12 gauge steel in the preferred embodiment. Center tube 201 fits within outer tube 101 and freely slides coaxially therein. Center tube 201 has two latch pin slots 250 and 260, as shown in FIG. 16B. One of these slots 250, 260 may be aligned with slot 150 of tube 101 at certain times during the operation of the device. As will be seen from the discussion of the device's latching mechanism below, two latching slots in center tube 201 are necessary since the relative position of tube 201 to the inner tube 301 and outer tube 101 is dependent upon whether a scooter is present on the platform when the actuator is fully retracted. A pair of base members 202 are fixed to the bottom of the center tube 201 by appropriate means such as welding. A guide arm 205, having a pivot tube 206 fixed to its upper end, is welded to one of the base members 202, as seen in FIG. 12.

A detent follower 220, shown in FIG. 8, is mounted to the base member 202 on the same side of the slide assembly 80 as the detent ramp 104. Follower 220 is attached in a hinged manner to the base member 202 and has a detent roller 221 rotatably attached to its upper end. A support plate 204, having a horizontal shaft 203, is welded to base member 202 adjacent the hinge of detent follower 220. A spring 222 is held on shaft 203 by a nut 223.

Spring 222 biases the detent follower 220 toward the center tube 201 or the outer tube 101, depending on the relative positions of the tubes 101, 201 to each other. The spring loading of the detent roller 221 is designed to urge the follower 220 to track the contour of the side of the slide assembly 80 which it engages. The setting of the spring 222 of the detent follower 220 is preselected for reasons discussed below.

A pair of pivot plates 207 are welded to the outer ends of base members 202 and are parallel to one another. A platform support tab 208 extends outwardly from each plate.

Figure 4:
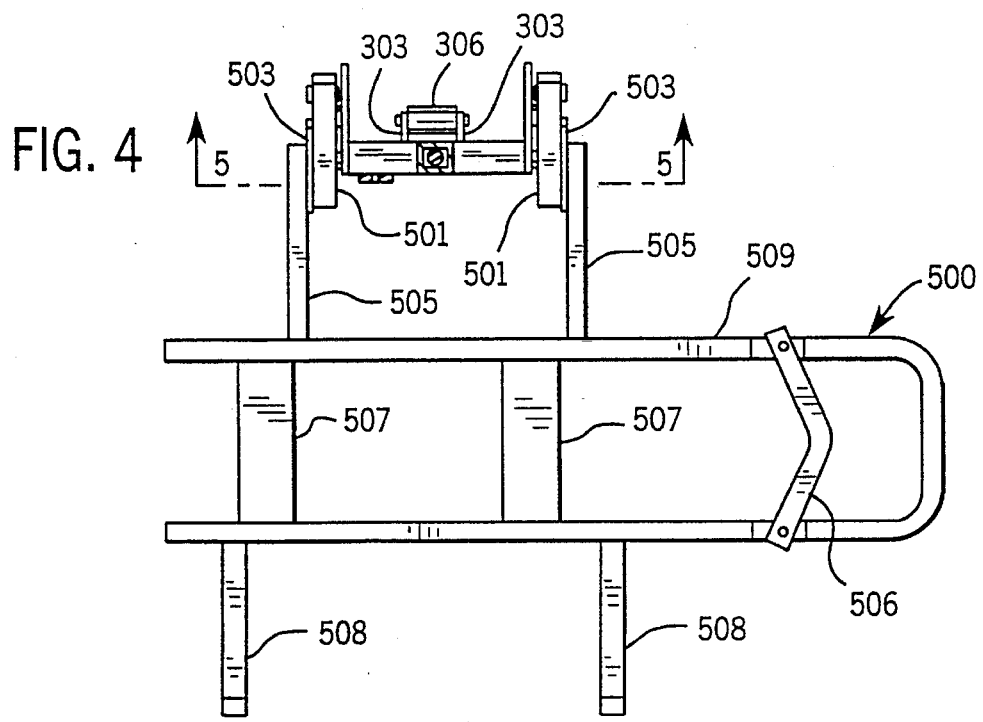
FIG. 4 is a top view of the platform of the present invention taken along the line 4—4 of FIG. 3.

Inner tube unit 300, as seen in FIG. 8, has an inner tube 301, also made of 12 gauge steel in the preferred embodiment, which slides freely and coaxially within center tube 201. An actuator mount member 302 is welded to the bottom end of inner tube 301. Inner tube 301 has a latch pin slot 350 shown in FIG. 16C which, when the actuator is fully retracted, whether or not a scooter is present, is aligned with slot 150 of outer tube 101. A pair of mounting brackets 303 shown in FIG. 7 are welded to the rear face of the actuator mount member 302. As seen in FIG. 4, a roller 306 is rotatably mounted between brackets 303.

Figure 10:
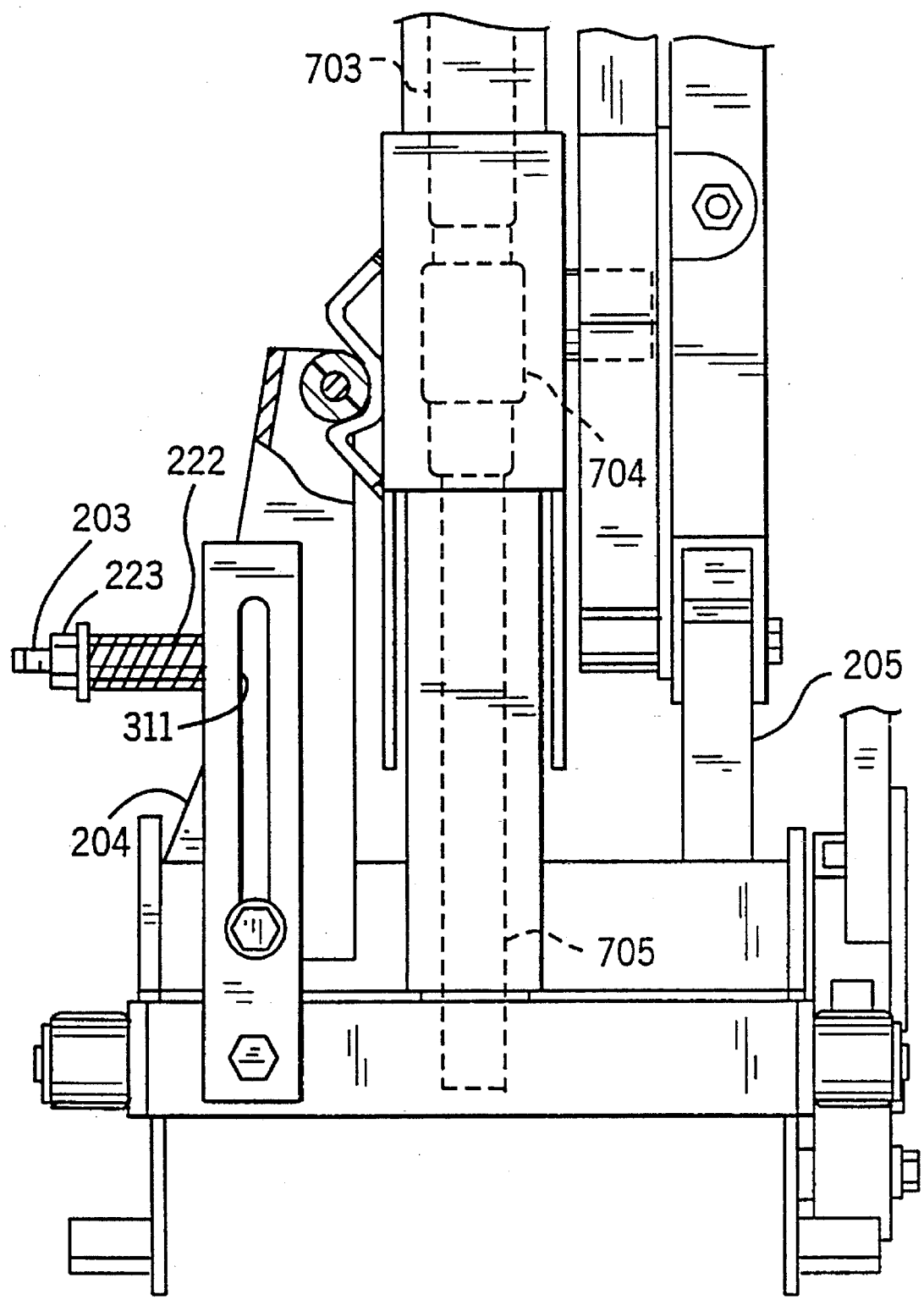
FIG. 10 is a partial front view of the tube assembly of the present invention in its unloaded storage position.

Two other rollers 304 are rotatably mounted to the ends of actuator mount member 302. Spatial separation of the inner tube unit 300 and center tube unit 200 is limited by a slide tube link 310 which is fixed to the actuator mount member 302 of the inner tube unit 300 by bolt 309. Link 310 has a slot 311 which is engaged by a pin 312, which also acts as the hinge for detent follower 220, on center tube unit 200. Slot 311 defines the minimum and maximum separation of the center tube unit 200 and inner tube unit 300, as seen in FIGS. 8 and 10.

Figure 2:
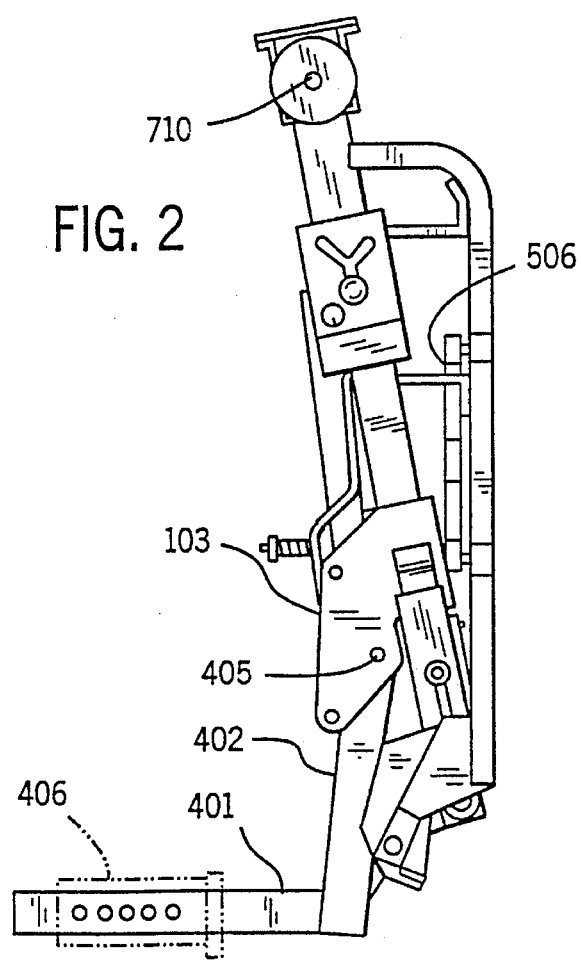
FIG. 2 is a side view of the present invention in its unloaded storage position.
Figure 9:
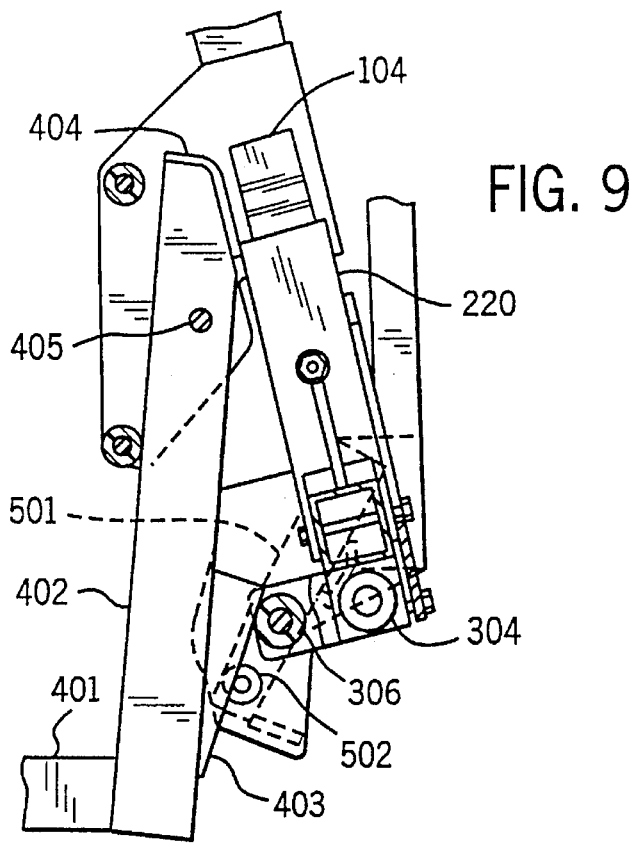
FIG. 9 is a partial side view of the mounting system of the present invention in its raised unloaded storage position.

The hoist device 50 is mounted to the hitch 406 of a motor vehicle 60 by means of a mounting weldment 400 shown in FIGURE 2. A receiver tube 401 is attached to the hitch 406 by suitable means. A main mounting member 402 is welded to the receiver tube 401. In the preferred embodiment, the receiver tube 401 and the member 402 form an angle of about 97 degrees. The plates 103 of outer tube unit 100 are pivotably attached to the main mounting member 402 by means of a pivot bolt 405 as seen in FIG. 9. This permits the entire slide tube assembly 80 to tilt relative to the mounting weldment 400 and thus the motor vehicle 60.

A roller channel 403 is attached to member 402 on the side of member 402 which faces the slide tube assembly 80. This channel 403 accepts roller 306 which is attached to inner slide tube 301. The top of member 402 has an end bracket 404 having a surface positioned to accept the tube assembly 80 while it is moving in either an up or down direction.

The platform weldment 500 is attached to the pivot plates 207 of the center tube unit 200 by pivot tubes 502. In the preferred embodiment, the platform 500 is adaptable to accommodate a three-wheeled or four-wheeled scooter. The specific design of the platform 500, however, can be altered to accommodate other scooters and other types of cargo.

In FIG. 4, the platform assembly 500 has a central bracket 509 with braces 507 which stabilize the platform. Two inside supports 505 are welded to bracket 509. A pair of outside supports 508 extend outwardly from the platform. Outside supports 508 are bent upward slightly to assist in holding a scooter or other cargo in place during transport and the raising and lowering of the platform 500.

Depending on the scooter being loaded, wheel stops can be attached to the platform 500 to help an operator properly position the scooter 70 prior to raising the platform. In FIGS. 2, 3 and 4, a stop 506 is shown. This configuration would be used for a three-wheeled scooter. That is, the scooter 70 would be driven or otherwise moved onto the platform 500 until the front wheel 72 of the scooter 70 contacted the stop 506. This positioning mechanism helps to reduce the risk of imbalance of the cargo on the platform 500. Proper positioning on the platform 500 also assists in the proper securing of the scooter 70 by the locking mechanism 600 as discussed more fully below.

Figure 11:
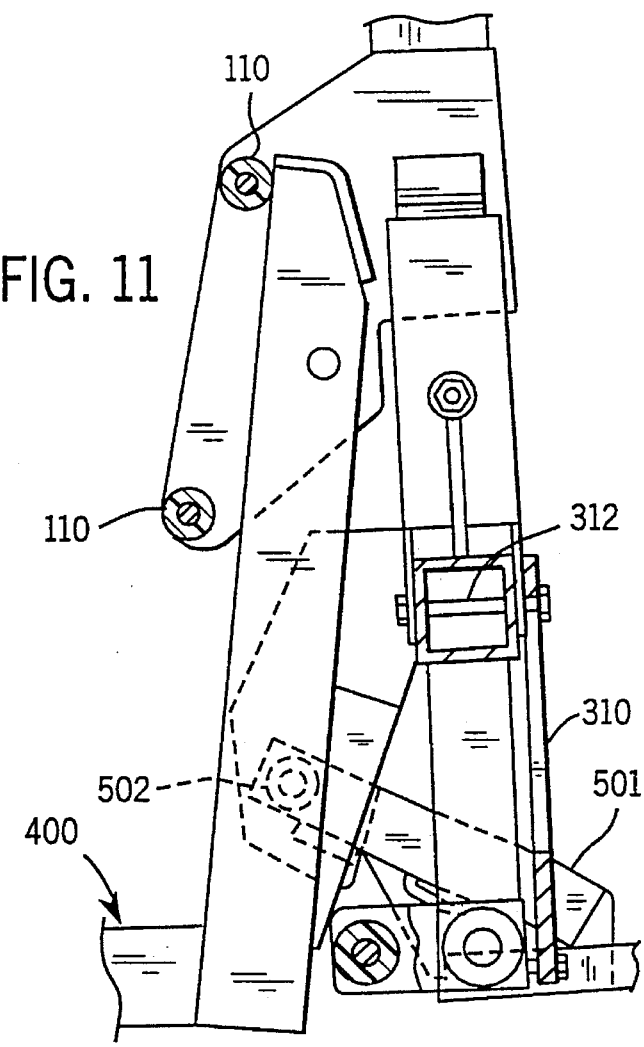
FIG. 11 is a partial side view of the present invention in a partially raised position.

As seen in FIGS. 4, 7 and 11, a support plate 503 is welded to each inside support 505. Mounting arms 501 are in turn welded to the support plates 503. A pivot tube 502 and a specially profiled roller ramp 504 are welded to each mounting arm 501. As seen in FIG. 9, support tabs 208 help prevent the platform 500 from pivoting too far back by blocking further rotation of arms 501. Support tabs 208 again engage arms 501 to also prevent platform 500 from rotating too far down, as seen in FIG. 7.

A unique locking mechanism 600 shown in FIG. 1 is used to secure a scooter 70 in place for storage or transportation. The locking mechanism 600 will only fully activate when a scooter 70 (or other cargo of sufficient weight) is present on the platform 500 and is designed to hold the scooter 70 firmly on the platform 500 during transport by applying firm downward pressure to the floor 75 of the scooter 70 at a point approximately midway between the front wheel 72 and rear wheels 74.

Figure 13:
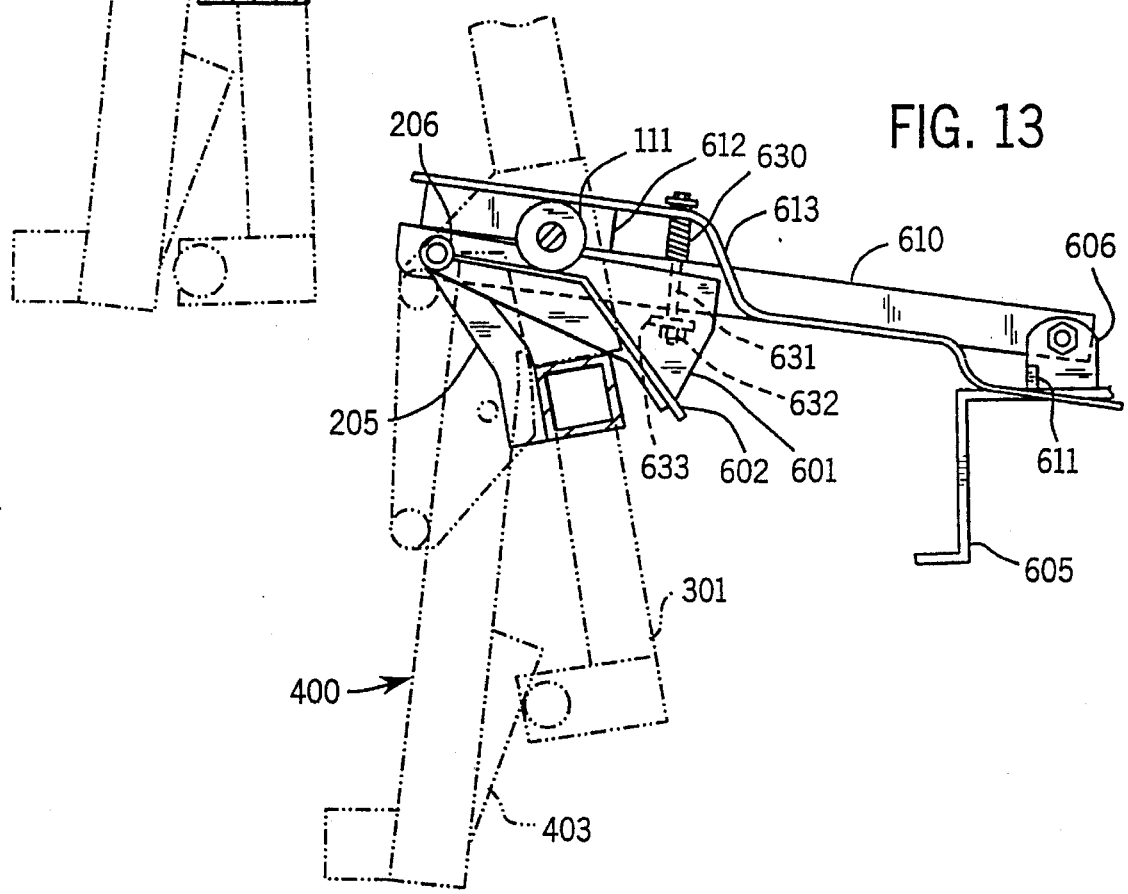
FIG. 13 is a side view of the locking mechanism of the present invention with its locking arm in a fully lowered position.

A dual ramp configuration shown in FIGS. 12 and 13 is used to accomplish selective locking of the mechanism 600. A locking arm 610 is pivotably attached at one end to the pivot tube 206 and guide arm 205 of the center tube unit 200. A first positioning ramp 613 is welded directly to the arm 610 at the middle section of the ramp 613. Ramp 613 is further secured to the arm 610 by a welded bracket 612.

A second positioning ramp 602 is secured to arm 610 by another bracket 601. Arm 610 and bracket 601 pivot off of the same point 206. Bracket 601 is further attached to the arm 610 by means of a spring 630 mounted on a bolt 631 and held on bolt 631 by a nut 632. Bolt 631 engages a support tab 633 welded to the bracket 601. Support tab 633 serves two functions. Tab 633 provides a surface on which spring 630 can act in biasing arm 610 and bracket 601 together. Secondly, tab 633 is a stop that holds ramp 613 and ramp 602 in a preselected orientation when arm 610 is not biased away from bracket 601, as seen in FIG. 12.

in this way, the bracket 601 can rotate independently of the arm 610 to the limit allowed by spring 630. When the bracket 601 does rotate independently of the arm 610, as seen in FIG. 13, spring 630 urges the two components together and attempts to force the arm 610 and bracket 601 to pivot in the same direction. Acting together, the two ramps 602, 613 allow the locking mechanism 600 to engage roller 111 of the outer tube unit 100 to determine movement and positioning of locking arm 610.

Pivotably attached to the second end of the locking arm 610 is a securing bracket 605. Bracket 605 is pivotably bolted to locking arm 610 by means of a clevis 606. The particular contour of the securing bracket 605 is dictated by the type of scooter or other cargo being transported. A stop 611 is provided to reduce interference from the bracket 605 during loading and unloading of a scooter or other cargo.

The drive system 700 for the device 50 consists mainly of a motor 701 and a vertically acting, screw type actuator 702 designed to freewheel at each end of its stroke. Motor 701 is mounted adjacent the top of the outer tube unit 100. A shaft 710 is provided on the motor 701 to permit manual operation of the device 50 by the operator in the event of motor failure. A hand crank (not shown) can be attached to the shaft 710. By rotating the crank, the actuator can be extended or retracted if necessary.

As can be seen in FIG. 5, the motor 701 engages actuator 702 in a gear housing 703. Actuator 702 extends down through the tube assembly 80 and is secured by appropriate means to the actuator mount 302. In the preferred embodiment, the actuator 702 utilizes an extension 705 which is connected to the main screw of the actuator 702 by a bracket 704. When the motor 701 is activated in one direction, the actuator 702 and tube assembly 80 are extended in a manner to be described in more detail below. Activation of the motor 701 in the other direction causes the actuator 702 and tube assembly 80 to retract upward.

In the preferred embodiment, as seen in FIG. 15, electricity is provided to the motor 701 through a circuit breaker 61 from the battery 65 of the motor vehicle 60 to which the hoist 50 is mounted through a switch assembly 800. Wiring includes connection to the brake lights 62 and running lights 63 of the vehicle 60 in the preferred embodiment. A suitable chassis ground 69 is also used. Generally, wiring of the present invention is a matter of design choice and will not be discussed in further detail. The switch assembly 800, however, is specially designed.

The switch assembly 800 is enclosed in housing 106, as seen in FIG. 5. As seen in FIGS. 3 and 16A, a keyswitch 831 is provided to permit selected enablement of the electrical system of the device 50. A control lever 801 extends outward from the housing 106 through a Y-shaped gate 830. Gate 830, shown in FIGS. 3 and 16A, has a stop slot 830a, a down slot 830b, and an up slot 830c. Unless the operator intentionally moves the lever 801 into either the up slot 830c or the down slot 830b, the lever 801 will otherwise rest in the stop slot 830a, preventing the motor 701 from running in either direction. Moreover, lever 801 must be moved upward out of stop slot 830c before it can be moved left or right into one of the other slots. Lever 801 is used by the operator to turn the motor 701 on and off and to govern the direction of the actuator when the motor is running.

Figure 14:
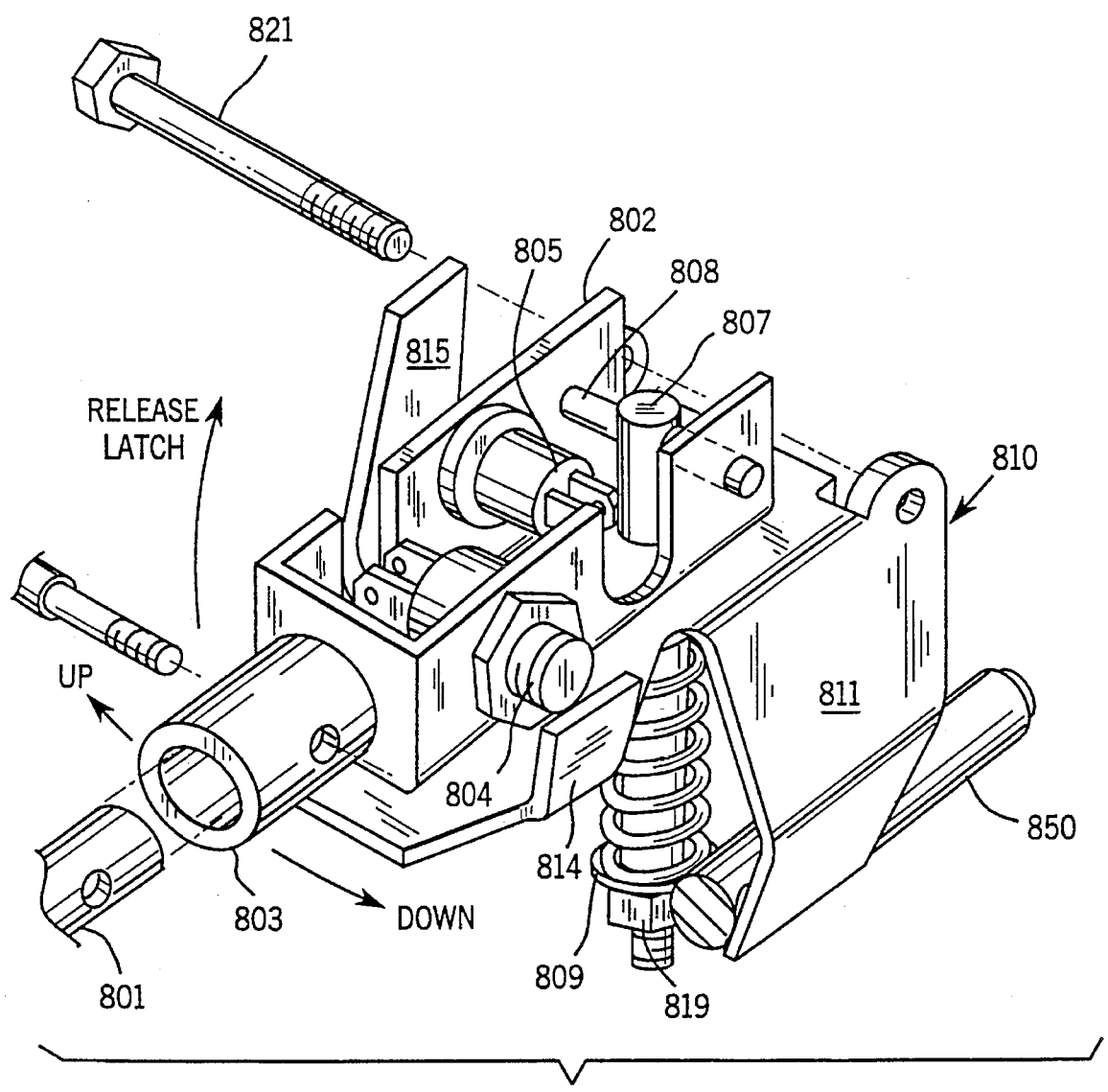
FIG. 14 is a partially exploded view of the control assembly of the present invention.

Inside housing 106, lever 801 is attached to a switch mounting channel 802 by a bushing 803, as seen in FIG. 14. Two weather-proof, push-button switches protrude from the channel 802. A down button 804 and an up button 805 are mounted with appropriate wiring, as shown in FIG. 15, to the motor 701 and the motor vehicle 60 within switch channel 802. Depressing the down button 804 causes the actuator screw 702 to rotate within the tube assembly 80 and thus lower the platform 500. In similar fashion, depressing the up button 805 causes the actuator screw 702 to rotate in the opposite direction and thus raise the platform 500.

Switch actuating bracket 810 is positioned directly below the channel 802 and limits activation of the switch 800 to preselected conditions. Bracket 810 has three wings-a latch wing 811, a down activation wing 814, and an up activation wing 815. In the preferred embodiment, latch wing 811 extends downward while up wing 815 and down wing 814 extend upward. Also, up wing 815 extends upward slightly higher than down wing 814 for reasons that will be explained below.

A switch mounting bracket 820 is welded to the outer tube 101, as seen in FIG. 5. Bracket 810 is pivotably attached to bracket 820 by a bolt 821. A second pivot bolt 807 extends vertically through bracket 810 and channel 802. A roll pin 808 passes through the switch channel 802 and the second pivot bolt 807. The longitudinal axis of roll pin 808 is parallel to the axis of bolt 821. Bracket 810 is mounted to bolt 807 by a nut 819 and a spring 809.

Switch channel 802 can pivot horizontally about bolt 807. Bracket 810 cannot pivot about bolt 807 due to the manner of its mounting to bracket 820. If no forces act to overcome the spring loading of channel 802 and bracket 810 together, then upward movement of the lever 801 will cause channel 802 and bracket 810 to pivot together about bolt 821. If sufficient force acts to overcome spring 809 (and thus restricts upward pivoting of the bracket 810), then channel 802 will pivot about pin 808, and bracket 810 and channel 802 will separate.

As seen from FIG. 14, if channel 802 was moved directly eft, up wing 815 would depress up button 805 and the motor 701 would run the actuator screw 702 in the direction to retract the tube assembly 80. Similarly, if channel 802 was moved directly right, down wing 814 would depress down button 804 and the motor 701 would run the actuator screw 702 in the direction to extend the tube assembly 80. The special structure of gate 830 shown in FIG. 16A prevents movement of the lever 801 left or right without also moving the lever up at the same time.

A latch pin 850 is welded to the latch wing 811 of bracket 810. Latch pin 850 prevents the platform 500 from dropping when the actuator is fully retracted and the control lever is in the stop slot 830a. When the tube assembly 80 is fully retracted with a scooter 70 on the platform 500, as seen in FIG. 1, then latch pin 850 engages slot 150 of outer tube 101, slot 250 of center tube 201, and slot 350 of inner tube 301. When the tube assembly 80 is fully retracted with platform 500 folded, as seen in FIG. 2, then latch pin 850 engages slot 150 of outer tube 101, slot 260 of center tube 201, and slot 350 of inner tube 301. In both conditions, if latch pin 850 is allowed to move into engagement with the tube assembly slots, then pin 850 blocks extension of the tube assembly 80.

Operation

While the following discussion relating to operation will again be in the context of use of the hoist with a personal transportation vehicle, or "scooter", this does not limit the types of cargo which the hoist can load, secure and transport. Operation of the present invention will be discussed in the context of four basic functions—raising the platform without a scooter present, lowering the platform without a scooter on it, raising the platform with a scooter on it, and lowering the platform with a scooter on it.

In FIG. 3, the platform 500 is on the ground and the tube assembly 80 is fully extended. The operator must move the control lever 801 from its normal resting position in the stop slot 830a up and left into the up slot 830c. Pin 850 is in engagement with slot 150, as can be seen from FIGS. 5 and 6A, but is free to move.

As the lever 801 moves into the up slot 830c, the upward movement of the lever 801 pivots channel 802 and bracket 810 about bolt 821 upward together. The lateral component of the lever movement moves the channel 802 to the left, but not the bracket 810, and forces the up button 805 into engagement with wing 815, thereby activating the motor 701 to retract the actuator screw 702 and thus to retract the tube assembly 80.

The center slide tube unit 200 begins to move upward, being carried by the inner tube unit 300 which is being pulled upward due to the direct connection between the actuator 702 and the actuator mount 302. The inner slide tube unit 300 maintains its position relative to the center slide tube unit 200 because the center tube unit 200 is free to slide upward and the weight of the platform 500 is acting against the rollers 304 at the base of inner slide tube unit 300. When the center tube unit 200 has been raised to the point where the detent follower 220 first contacts the bottom node 104b of the detent ramp 104, the resistance to upward movement of the center tube unit 200 will be greater than the force needed to raise and rotate the platform 500 about its pivot point 502 on the pivot plates 207 of the center tube unit 200.

During the bottom portion of the actuator stroke in either direction, the platform 500, inner tube unit 300 and center tube unit 200 move up or down in a linear manner, maintaining a constant relationship to one another. The platform 500 is in a horizontal position whether a scooter is present or not.

Once the detent follower 220 engages the detent ramp 104, the logic mechanism of the device controls further movement of the inner tube unit 300 and center tube unit 200. When no scooter is present on the platform 500, the center tube unit 200 ceases upward movement at this point. The spring 222 is set so that the resistance presented to the follower 220 by the detent ramp 104 is greater than the resistance to rotation of the platform 500 posed by the rollers 304 on the inner tube unit 300 acting on the ramps 504 located on the mounting arms 501 of the platform 500.

Continued upward movement of the inner slide tube unit 300 causes platform 500 to rotate upward about its pivot points 502 on plates 207 of the center tube unit 200. The rollers 304 of the inner slide tube unit 300 traverse the specially profiled ramps 504 of the platform weldment 500. The special profile of the ramps 504 causes greater rotation of the platform 500 into its fully stored position than would be the case if the rollers 304 moved straight along the mounting arms 501.

The platform 500 moves into its fully stored position, as seen in FIG. 2, during the last several inches of upward movement of the tube assembly 80. When the tube assembly 80 is fully retracted, the actuator 702 will freewheel and upward movement will cease without stalling the motor 701 or damaging the device 50. During the final inches of upward movement, the roller 221 of the detent follower 220 moves up and over the bottom node 104b of the detent ramp 104 and nests in the depression between lower node 104b and upper node 104a, as seen in FIG. 10.

As the actuator 702 nears its fully retracted position, roller 306 mounted to the back of inner tube unit 300 encounters the roller channel 403. As the roller 306 climbs the channel 403, the tube assembly 80 rotates about pivot point 405, where the outer tube unit 100 is mounted to the mounting weldment 400. The top of the tube assembly 100 moves toward the motor vehicle 60 while the bottom of the lift assembly 100 moves outward and up slightly. By tilting the device 50 forward, the weight of the device 50 is shifted toward the vehicle 60 and additional ground clearance is provided under the device 50.

When the control lever 801 is then lowered into the stop slot 830a of gate 830, latch pin 850 once again engages slot 150 of outer tube 101. At this point, however, the tube assembly 80 is in the position shown in FIGS. 2 and 9, and pin 850 also engages slot 260 of center tube 201 and slot 350 of inner tube 301 since these slots 150, 260 and 350 are now in alignment. Pin 850 thus locks the tube assembly 80 in this position. If the actuator should backdrive at some time during storage (e.g., during transport of the device 50), pin 850 reduces the chance that the tube assembly 80 will extend.

The locking mechanism 600 is only activated (i.e., pivoted downward) when there is sufficient relative movement between the inner tube unit 300 and the center tube unit 200 to permit roller 111 to track ramp 613. Adequate relative movement does not occur when the platform 500 is empty since the actuator 702 is in a fully retracted position with the roller 221 of follower 220 in its nested position between the nodes of ramp 104.

However, during approximately the last inch of actuator travel, the locking mechanism 600 allows the arm 610 to pivot forward slightly. The platform 500 forces the securing bracket 605 back slightly. Roller 111 engages ramp 602, resulting in firm engagement between the platform 500 and the bracket 605 which prevents rattling during transit of the unloaded device 50.

The platform 500 is now in its empty stored position (i.e., fully up without a scooter on it). To lower the platform 500, an operator must move the control lever 801 from the stop slot 830a of gate 830 up and right into the down slot 830b. If the actuator has extended (i.e., backdriven) slightly, then center tube 201 and/or inner tube 301 may be applying downward pressure on the latch pin 850 since it is now engaging slots 260 and 350. The pressure exerted by the tubes on the side of the pin 850 prevents it from being withdrawn from the slots 150, 260 and 350 when an attempt is made to activate the down button 804. The pin 850 is thus loaded.

Because the switch channel 802 is mounted to the switch actuating bracket 810 by the spring loaded pivot bolt 807, the switch channel 802 (and lever 801) can move independently of the bracket 810 when the lever 801 is moved through the gate 830. The wings of the bracket 810 are designed so that the down wing 814 of bracket 810 cannot activate down button 804 if the latch pin 850 is loaded. When pin 850 is loaded, button 804 misses wing 814 when the lever 801 is moved up and right through the down slot 830b of gate 830.

Activation of the motor 701 to drive the actuator 702 down when the pin 850 is loaded could damage the device 50. Therefore, although the switch assembly 800 prevents activation of the down button 804, the up button 805 can still be activated. As noted above, up wing 815 is slightly longer vertically than the down wing 814. Therefore, even if the channel 802 pivots about pin 808 and moves independently of the bracket 810 due to loading of the pin 850, the actuator can be run upward by moving the lever 801 up and left into the up slot 830c of the gate 830. Once the loading by inner tube 301 and center tube 201 is alleviated, pin 850 can be withdrawn fully.

Since the pin 850 has been unloaded, lever 801 is moved into the down slot 830b. Pin 850 releases and wing 814 activates down button 804 on the switch channel 802. Motor 701 extends the actuator 702. Roller 221 of the detent follower 220 encounters resistance from the lower node 104b of the detent ramp 104. The center tube unit 200 cannot move, so inner tube unit 300 begins to move downward, allowing platform 500 to unfold to its flat position during the first few inches of downward actuator travel. This also causes the tube assembly 80 to rotate about pivot 405, bringing the device 50 out of its forward tilt position.

As the inner tube unit 300 continues its downward movement, the slide tube link 310 limits separation of the center tube unit 200 and the inner tube unit 300 and causes the center tube unit 200 to begin downward movement. The detent follower 220 of the center tube unit 200 then traverses the lower node 104b of the detent ramp 104 and allows the platform 500 (which is attached to the center tube unit 200 at its pivot plates 207) to be lowered to the ground (i.e., until the actuator 702 is fully extended).

Figure 6:
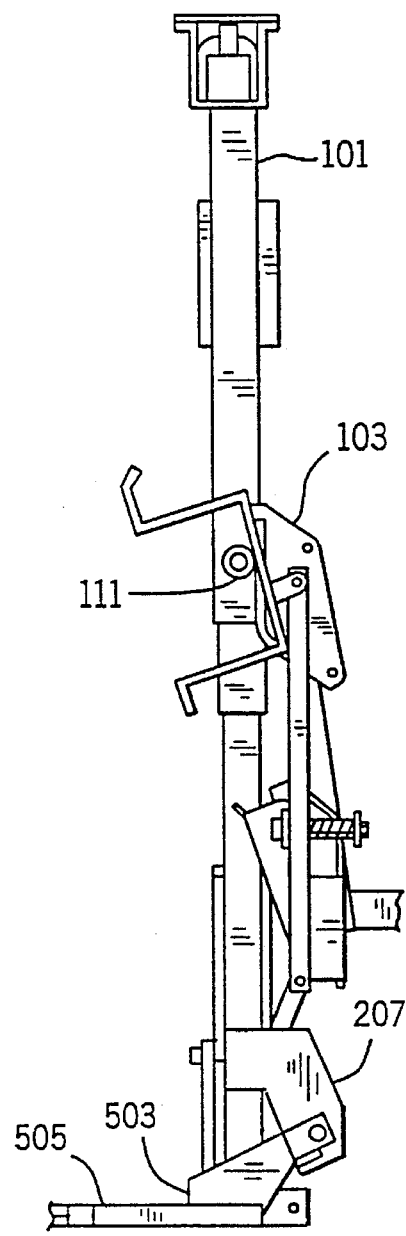
FIG. 6 is a partial side view of the present invention in its lowered loading/unloading position showing the locking mechanism of the device.

At the beginning of the extension of the actuator 702, the locking mechanism 600 is engaging the platform 500. As the tube assembly 80 is extended, the platform 500 pivots open, as discussed above, and ramp 613 engages roller 111. As the center tube unit 200 to which the ramp 613 is attached is lowered, the roller 111 traverses the ramp 613 until the tube assembly 80 is fully extended as shown in FIG. 6. Extension of the tube assembly 80 thus moves securing bracket 605 up and out of the way to the position shown in FIG. 6.

In order to store a scooter on the device 50, the scooter 70 is driven or otherwise moved onto the platform 500 until the front wheel 72 engages the wheel stop 506, or until the scooter 70 is otherwise properly positioned on the platform 500. The control lever 801 is then moved from the stop slot 830a in gate 830 up and left into the up slot 830c. This allows up wing 815 of bracket 810 to activate the up button 805 of channel 802. Motor 701 begins driving actuator 702 and the tube assembly 80 starts to retract. Again, as discussed above, the tube assembly 80 will tilt forward toward the motor vehicle 60 during the final inches of actuator travel.

When device 50 is operated with a scooter 70 on platform 500, the resistance to upward movement of the center tube unit 200 and platform 500, as measured by spring loaded follower 220 encountering lower node 104b of ramp 104, is not sufficient to permit movement of the inner tube unit 300 relative to the center tube unit 200. Therefore, the platform 500 remains flat while it rises to the fully retracted position of the actuator 702. The roller 221 of the detent follower 220 moves up and over both nodes 104a, 104b of the detent ramp 104 and eventually comes to rest above the top node 104a of detent ramp 104 once center tube unit 200 has retracted fully relative to outer tube unit 100.

When the tube assembly 80 is fully retracted, the control lever 801 is moved down into the stop slot 830a of the gate 830. This stops motor 701 and allows the latch pin 850 to move into engagement with slot 150 of the outer tube 101, slot 250 of the center tube 201, and slot 350 of the inner tube 301. Once again, as discussed above, this latching of the tube assembly 80 reduces the risk of the platform 500 lowering in an undesirable manner or in conditions inappropriate for lowering.

The locking mechanism 600 will only fully activate when a scooter 70 is present on the platform 500 since activation of the locking mechanism 600 depends upon center tube unit 200 moving vertically relative to the outer tube unit 100. Since roller 221 and follower 220 pass over the detent ramp 104 completely, the center tube unit 200 and the outer tube unit 100 are allowed to telescope together completely.

As the center tube unit 200 slides into the outer tube unit 100, roller 111 engages the actuation ramp 602 of the locking mechanism 600, forcing the bracket 601 and arm 610 to pivot down to engage the scooter 70 and the platform 500. The arm 610 and bracket 601 will continue to pivot downward until they contact the scooter 70. The securing bracket 605 will prevent the arm 610 from pivoting further. However, the bracket 601 will continue to pivot briefly due to the pressure applied by the roller 111 on the ramp 602.

The securing bracket 605 will be in locking engagement with the floor 75 of the scooter 70, as shown in FIG. 1. Spring 630 compresses, maintaining firm pressure on the scooter 70 during storage in this position. Spring 630 permits a predictable, adjustable force to be applied to the cargo with reduced risk of damage to the cargo or the device 50.

As discussed above, if the actuator backdrives prior to moving lever 801 into the down slot 830b, motor 701 will not be activated. Instead, the operator will have to first move the lever 801 into the up slot 830c of gate 830 to unload pin 850. After this has been done, the platform 500 and scooter 70 can then be lowered.

When the platform 500 is lowered with a scooter 70 on it, the slide tube units maintain their positions relative to one another throughout extension of the actuator 702. The resistance presented by the nodes of the detent ramp 104 is not sufficient to stop or alter the downward movement of the center tube unit 200. Once the actuator 702 is fully extended, the actuator 702 freewheels with continued application of power.

During the lowering of the platform 500 with a scooter 70 loaded on it, the inner tube unit 300 does not move relative to the center tube unit 200. Instead, the center tube unit 200 extends down from the outer tube unit 100. As this happens, the center tube unit 200 is lowered relative to roller 111, releasing the pressure applied to securing bracket 605 by ramp 602 and spring 630. The pivot point 206 of arm 610 and bracket 601 move down with the center tube unit 200. During this movement, roller 111 tracks ramp 613. As a result, arm 610 and bracket 601 pivot upward away from the platform 500 until arm 610 is vertical as seen in FIG. 6.

Variations, modifications and other applications of the present invention will become apparent to those presently of ordinary skill in the art after reviewing the specification in connection with the FIGURES. Therefore, the above description of the preferred embodiment is to be interpreted as illustrative rather than limiting. The scope of the present invention is to be limited solely by the scope of the claims which follow.

What is claimed is:

1. A device for raising and securing cargo, said device comprising:
    A) a slide tube assembly comprising
        1) an outer tube unit; and
        2) a slide tube subassembly comprising
            a) a center tube unit slidable within said outer tube unit; and
            b) an inner tube unit slidable within said center tube unit;
    B) a platform attached to said slide tube assembly, said platform being pivotable between an open position and a closed position;
    C) selectively operable drive means for raising and lowering said slide tube subassembly;
    D) a first logic mechanism for automatically detecting whether cargo of a preselected minimum weight is present on said platform and for controlling pivoting of said platform; and
    E) a manually operable switch for switching on and off said drive means and controlling the direction which said drive means moves said slide tube subassembly, said switch comprising
        1) a manually operable lever;

2) Y-shaped gate through which said lever passes, said gate having three slots including a stop slot extending downwardly, an up slot extending upwardly, and a down slot extending upwardly;

wherein said lever rests in said stop slot and prevents operation of said drive means unless said lever is raised to one of said upwardly extending slots to move said slide.

2. A device for raising and securing cargo, said device comprising:

A) a slide tube assembly comprising
1) an outer tube unit; and
2) a slide tube subassembly comprising
a) a center tube unit slidable within said outer tube unit; and
b) an inner tube unit slidable within said center tube unit;

B) a platform attached to said slide tube assembly, said platform being pivotable between an open position and a closed position;

C) selectively operable drive means for raising and lowering said slide tube subassembly; and D) a first logic mechanism for automatically detecting whether cargo of a preselected minimum weight is present on said platform and for controlling pivoting of said platform, wherein said first logic mechanism includes
a) a ramp mounted to said outer tube unit;
b) a spring loaded follower mounted to said center tube unit, said ramp providing resistance to upward movement of said follower when said drive means raises said slide tube subassembly; and
c) a pair of rollers mounted to said inner tube unit; wherein during upward movement of said slide tube subassembly, said rollers engage said platform to urge rotation of said platform to said closed position.

3. The device of claim 2 wherein said spring loaded follower is adjustable to set the minimum weight that said first logic mechanism automatically detects on said platform.

4. The device of claim 3 wherein said slide tube subassembly is vertically movable between a lowered position and at least one raised position; further wherein said platform is in said open position whenever said slide tube subassembly is in said lowered position; further wherein, while said slide tube subassembly is raised from said lowered position, said platform pivots into said closed position when said first logic mechanism does not detect a preselected minimum weight on said platform; and further wherein, while said slide tube subassembly is raised from said lowered position, said platform remains in said open position when said first logic mechanism detects a preselected minimum weight on said platform.

5. The device of claim 4 further comprising a locking arm assembly comprising:

A) a locking arm attached to said center tube unit, said locking arm being pivotable between an upright position and an engaging position;

B) a second logic mechanism for controlling pivoting of said locking arm; wherein said second logic mechanism causes said locking arm to pivot into said engaging position when said first logic mechanism detects a preselected minimum weight on said platform and said slide tube subassembly is raised; and further wherein said second logic mechanism maintains said locking arm in said upright position when said first logic mechanism does not detect a preselected minimum weight on said platform and said slide tube subassembly is raised.

6. The device of claim 5 further comprising a manually operable switch for switching on and off said drive means and controlling the direction which said drive means moves said slide tube subassembly, said switch comprising A) a manually operable lever;

B) a Y-shaped gate through which said lever passes, said gate having three slots including a stop slot extending downwardly, an up slot extending upwardly, and a down slot extending upwardly;

wherein said lever rests in said stop slot and prevents operation of said drive means unless said lever is raised to one of said upwardly extending slots to move said slide tube subassembly.

7. The device of claim 6 further comprising means attached to said outer tube unit for mounting said device to a vehicle.

8. A device for selectively raising and securing cargo, said device comprising:

A) a fixed unit comprising a first member having a ramp;

B) a lifting unit vertically movable between a raised position and a lowered position, said lifting unit comprising:
1) a second member having
a) a spring loaded follower, said ramp providing resistance to upward movement of said follower; and
b) a platform, said platform being pivotable between a closed position and an open position; and
2) a third member slidable into said second member, and having a pair of rollers at the base of said third member, wherein during upward movement of said lifting unit said rollers engage said platform to urge pivoting of said platform to said closed position;

C) a drive unit connected to said lifting unit to selectively raise and lower said lifting unit relative to said fixed unit;

D) means for detecting whether a preselected minimum weight is present on said platform, said detecting means including said ramp and said follower;
wherein said platform is in its open position whenever said lifting unit is in said lowered position;
further wherein said platform pivots into said closed position when said detecting means does not detect a preselected minimum weight on said platform and said lifting unit is raised; and further wherein said platform remains in said open position when said detecting means detects a preselected minimum weight on said platform and said lifting unit is raised.

9. The device of claim 8 wherein the spring loading of said follower is set so that, when said detecting means detects a preselected minimum weight on said platform, the resistance to pivoting of said platform posed by said rollers of said third member is greater than the resistance presented to said follower by said ramp;

further wherein the spring loading of said follower is set so that, when said detecting means does not detect a preselected minimum weight on said platform, the resistance to pivoting of said platform posed by said rollers of said third member is less than the resistance presented to said follower by said ramp.

10. The device of claim 9 wherein the spring loading of said follower is adjustable to permit selection of the minimum weight detectable by said detecting means.

11. The device of claim 10 further comprising a manually operable switch for switching on and off said drive unit and controlling the direction in which said drive unit moves said lifting unit, said switch comprising
  A) a manually operable lever;
  B) a Y-shaped gate through which said lever passes, said gate having three slots including a stop slot extending downwardly, an up slot extending upwardly, and a down slot extending upwardly;
    wherein said lever rests in said stop slot and prevents operation of said drive unit unless said lever is raised to one of said upwardly extending slots to move said lifting unit.

12. The device of claim 11 wherein said device further comprises a locking arm assembly, said locking arm assembly comprising:
  A) a pivotable locking arm attached to said second member; and
  B) a locking arm logic mechanism for engaging cargo on said platform when said platform remains in said open position and when said detecting means detects a preselected minimum weight on said platform and said lifting unit is lifted to its raised position.

13. A device for raising and securing a scooter to the outside of a vehicle, said device comprising:
  A) a slide tube assembly comprising
    1) an outer tube unit comprising
      a) a first tube;
      b) means for mounting said first tube to the outside of a vehicle; and
      c) a ramp mounted to said outer tube unit;
    2) a slide tube subassembly vertically movable between a lowered position and at least one raised position, said subassembly comprising:
      a) a center tube unit comprising
        i) a second tube slidable within said first tube;
        ii) a spring loaded follower mounted to said center tube unit, said ramp providing resistance to upward movement of said follower when said center tube unit is raised relative to said outer tube unit; and
        iii) a platform attached to said second tube, said platform being pivotable between an open position and a closed position, wherein said platform is in its open position whenever said slide tube subassembly is in said lowered position;
      b) an inner tube unit comprising
        i) a third tube slidable within said second tube; and
        ii) a pair of rollers mounted to said third tube, wherein during upward movement of said slide tube subassembly, said rollers engage said platform to urge pivoting of said platform to said closed position;
  B) drive means for raising and lowering said slide tube subassembly; and
  C) a first logic mechanism for automatically detecting whether cargo of a preselected minimum weight is present on said platform and for controlling pivoting of said platform, said first logic mechanism including said ramp, said follower and said rollers, the spring loading of said follower being adjustable to select the minimum weight that said first logic mechanism can automatically detect on said platform;
  wherein while said slide tube subassembly is raised from said lowered position, said platform pivots into said closed position when said first logic mechanism does not detect a preselected minimum weight on said platform; and
  further wherein, while said slide tube subassembly is raised from said lowered position, said platform remains in said open position when said first logic mechanism detects a preselected minimum weight on said platform.

14. The device of claim 13 further comprising a manually operable switch for switching on and off said drive means and controlling the direction in which said drive means moves said slide tube subassembly, said switch comprising
  A) a manually operable lever;
  B) a Y-shaped gate through which said lever passes, said gate having three slots including a stop slot extending downwardly, an up slot extending upwardly, and a down slot extending upwardly;
    wherein said lever rests in said stop slot and prevents operation of said drive means unless said lever is raised to one of said upwardly extending slots to move said slide tube subassembly.

15. The device of claim 14 further comprising a locking arm assembly comprising:
  A) a locking arm attached to said center tube unit, said locking arm being pivotable between an upright position and an engaging position;
  B) a second logic mechanism for controlling pivoting of said locking arm; wherein said second logic mechanism causes said locking arm to pivot into said engaging position when said first logic mechanism detects a preselected minimum weight on said platform and said slide tube subassembly is raised; and
    further wherein said second logic mechanism maintains said locking arm in said upright position when said first logic mechanism does not detect a preselected minimum weight on said platform and said slide tube subassembly is raised.

* * * * *